United States Patent [19]

Tucker

[11] 4,200,433

[45] Apr. 29, 1980

[54] USE OF NICKEL PHENOLATE OF O,O'-BIS(P-1,1,3,3-TETRAMETHYLBUTYL-PHENOL)SULFONE AND A PHOSPHITE IN DYEING POLYOLEFINS

[75] Inventor: Robert J. Tucker, Hackettstown, N.J.

[73] Assignee: American Cyanamid Company, Stamford, Conn.

[21] Appl. No.: 939,018

[22] Filed: Sep. 1, 1978

[51] Int. Cl.² .......................... C09B 45/00; D06P 1/10
[52] U.S. Cl. ............................................. 8/42 D; 8/4; 8/180; 8/DIG. 9; 260/439 R; 264/78; 525/340; 525/353; 525/370
[58] Field of Search .............. 8/42 D, 180, 4, DIG. 9; 526/27, 40, 48.1

[56] References Cited

U.S. PATENT DOCUMENTS 3,072,601   1/1963   Breslow .................. 260/45.75 N

FOREIGN PATENT DOCUMENTS 45-7000584   1/1970   Japan .

OTHER PUBLICATIONS

Hartley; P. N., *International Dyer,* 1965, 134, 541–543.

*Primary Examiner*—A. Lionel Clingman
*Attorney, Agent, or Firm*—Bruce F. Jacobs

[57] ABSTRACT

A dyeable olefinic polymer composition comprising an olefinic polymer, and the reaction product of 50 to 90% by weight of the full nickel phenolate of o,o'-bis(p-1,1,3,3-tetramethylbutylphenol)sulfone and 50 to 10% by weight of a secondary or tertiary organic phosphite.

14 Claims, No Drawings

USE OF NICKEL PHENOLATE OF O,O'-BIS(P-1,1,3,3-TETRAMETHYLBUTYL-PHENOL)SULFONE AND A PHOSPHITE IN DYEING POLYOLEFINS

This invention relates to the dyeing or printing of olefinic polymers. More particularly, it relates to the use of the reaction product of the full nickel phenolate of o,o'-bis(p-1,1,3,3-tetramethylbutylphenol)sulfone and a secondary or tertiary organic phosphite in an olefinic polymer, particularly polyalpha-olefins and most particularly, polypropylene, to prevent a loss in dyeability when the polymer is exposed to high temperatures.

Olefinic polymers, particularly poly alpha-olefins, are important as textile fibers because of the economic and physical advantages which they offer. However, the poor dyeability of such fibers has been a longstanding problem. One method of improving the dyeability of these materials has been to incorporate into the olefinic polymer a nickel compound which can serve as a dye-site for a chelatable dye. However, some nickel compounds show a loss in dyeability at the high temperatures (200°–300° C.) required for processing olefinic polymer fibers, films, and fabrics compared to similar materials not exposed to these high temperatures. It is believed that the loss in dyeability may be related to partial homopolymerization of the nickel compound and subsequent separation of the nickel-containing polymer from the olefinic polymer.

An example of a nickel compound which loses dyeability when processed at high temperatures (250°–290° C.) is the full nickel phenolate of o,o'-bis(p-1,1,3,3-tetramethylbutylphenol)sulfone which is disclosed by Breslow in U.S. Pat. No. 3,072,601 as an ultraviolet light stabilizer in polyolefins.

Japanese Patent No. 584/70 discloses the simultaneous use of the full nickel phenolate and a tertiary phosphite to improve the dyeability of a polyolefin. The phenolate and phosphite are added to polypropylene and the mixture pelletized at 220° C.

While Japanese Patent No. 584/70 represents an improvement over U.S. Pat. No. 3,072,601, it has been found in the present invention that when the nickel phenolate and a phosphate are specifically prereacted, such that a true reaction product results, still further improvement in the dyeability of a polyolefin occurs. This improvement is demonstrated by the increase in the optical density of comparable samples.

The term "full nickel phenolate", as used herein, means that all of the phenolic hydrogens of the sulfone are replaced by nickel atoms. The full nickel phenolate of o,o'-bis(p-1,1,3,3-tetramethylbutylphenol)sulfone may be represented by formula (I):

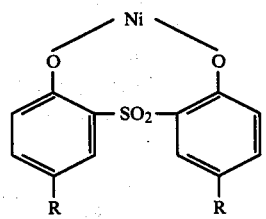

(I)

wherein R is 1,1,3,3-tetramethylbutyl.

In accordance with the present invention, there is provided a dyeable and printable composition of an olefinic polymer which comprises incorporating into said polymer from about 0.7% to about 4% by weight of the reaction product of 50–90% by weight of a compound of formula (I) and 50–10% by weight of a secondary or tertiary phosphite, based on the weight of the polymer. Higher amounts of the reaction product may be used but it has not been found to be necessary to obtain the improved dyeability. A fiber, film, or fabric may be prepared from the resulting blend, and it may then be dyed with a chelatable dye, preferably an ortho hydroxy monoazo dye.

In the preferred embodiment of this invention, the reaction product is prepared from about 85 to 65% by weight of the compound of formula (I), and from about 15% to about 35% by weight of said phosphite, based on the weight of the polymer. It is made by mixing the two materials in a suitable solvent, such as toluene, and the solvent is subsequently removed to obtain a green-colored solid which is incorporated into the polymer. More preferably, said phosphites are triisodecyl phosphite and diisodecyl pentaerythrityl diphosphite.

In the especially preferred embodiment of this invention, the olefinic polymer is polypropylene and the phosphite is triisodecyl phosphite.

The compound of formula (I) may be prepared by reacting one mole of o,o'-bis(p-1,1,3,3-tetramethylbutylphenol)sulfone with two moles of sodium hydroxide in a mixture of tetrachloroethylene and methanol under nitrogen at ambient to slightly elevated temperature (45°–65° C.) to form the disodium phenolate in situ and reacting the latter with one molecular portion of nickel chloride hexahydrate to form the nickel compound represented by formula (I). The product is recovered by conventional methods.

The following phosphites are illustrative of the secondary and tertiary phosphites which may be used with the compound of formula (I):
dioctadecyl pentaerythrityl diphosphite,
triisodecyl phosphite,
diisodecyl pentaerythrityl diphosphite,
distearyl pentaerythrityl diphosphite,
distearyl phosphite,
tris(nonylphenyl)phosphite,
trimethyl phosphite,
dioctyl phosphite,
poly(diisopropyleneglycol phenylphosphite),
tris(3-hydroxypropyl)phosphite,
trioctadecyl phosphite,
diphenyl phosphite,
triphenyl phosphite,
diphenylisodecyl phosphite,
tricyclohexyl phosphite, and the like.

The preferred phosphites are diisodecyl pentaerythrityl diphosphite and triisodecyl phosphite.

As used herein, the term "olefinic polymers" means homopolymers of mono alpha-olefins such as low density polyethylene, high density polyethylene, polypropylene, polystyrene, polybutadiene, polybutylene, polyisoprene, and the like, and copolymers such as ethylene-propylene copolymer, ethylenebutylene copolymer, ethylene-vinyl acetate copolymer, styrenebutadiene copolymer, acrylonitrile-styrene-butadiene copolymer, and the like. The preferred olefinic polymer is a poly alphaolefin having about 2 to 4 carbon atoms; the most preferred is polypropylene.

The reaction product of the compound of formula (I) and the phosphite may be incorporated into the polymers by any of the various procedures known in the art such as by dry blending the materials with the polymer in powder or granular form, followed by milling, Banbury mixing, molding, casting, extruding, swelling, and the like, to obtain a dyeable polymeric fiber or film.

When the prereacted adduct of the nickel phenolate and the phosphite is used, the temperature of incorporation is not critical, and any conventional processing conditions may be used.

The pre-reacted adduct of the compound of formula (I) and the phosphite may be incorporated into the polymer along with other conventional stabilizers such as ultraviolet light absorbers, antioxidants, amines, antistatic agents, fillers, and the like.

The resulting polymer composition can be dyed or printed by contacting it in the form of a fiber, film, or fabric with a solution or a dispersion of a chelatable dyestuff in a neutral, acidic or alkaline dyebath, or with a printing paste. Preferably, the dyeing or printing is carried out in an acidic medium at about 50°-130° C., more preferably at about 95°-100° C. At temperatures above 100° C. the dyeing or printing may be carried out in a closed vessel at super-atmospheric pressure.

The print paste used for the printing of chelatable dyes is generally composed of a thickener, carrier, acid for pH control, sequestrant, and water in addition to the dye.

The dyebath may also contain an acid, thickener, carrier, or sequestrant in addition to water and the dye.

Suitable acids include citric, tartaric, acetic, and the like. The acid is used to promote the chelation reaction and thereby obtain good wet crocking fastness.

Suitable carriers including trichlorobenzene, esters or aromatic carboxylic acids, diphenyl ether, and the like.

Suitable thickeners include methyl cellulose, carboseed ether, sodium alginate, carboxymethyl cellulose, and the like. The thickener imparts good color value and crocking fastness.

Suitable dispersing agents and emulsifiers include sodium lignosulfonate, the sodium salts of polymeric carboxylic acids, polyoxyethylene alcohols, sodium N-methyl-n-oleoyl taurate, and the like.

Suitable sequestrants include ethylenediamine, citric acid, tartaric acid, and the like. The sequestering agents are effective for removing iron and copper salts at pH values below 5.

The chelatable dyes which are useful in this invention include aromatic ortho hydroxy mono-azo and conjugated di- and multi-azo dyes. These include the Polypropylene series of dyes produced by the National Aniline Division of Allied Chemical Company, such as Polypropylene Green BM and Polypropylene Scarlet RBM.

Polypropylene Green BM is represented by the formula:

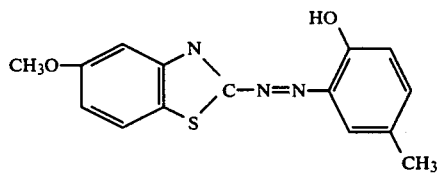

Structural formulas for two other ortho hydroxy azo dyes which may be used are shown below:

Sudan Orange RRA (Solvent Orange 7)

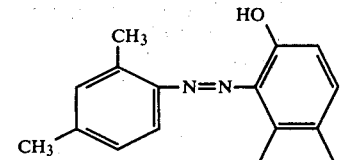

Sudan Red 4BA (Oil Red 24)

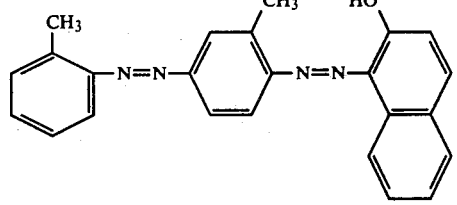

Other suitable azo dyes which may be used include:
C. I. Disperse Yellow 94
C. I. Disperse Yellow 95
C. I. Disperse Yellow 96
C. I. Disperse Blue 136
C. I. Disperse Blue 137
C. I. Disperse Red 144
C. I. Disperse Violet 45
C. I. Disperse Orange 64
C. I. Disperse Orange 65

Following conventional methods the printing paste containing a suitable dye may be applied to a polymer fabric by a printing block, stencil, roller, or spraying device, after which the printed fabric is dried and optionally steamed, if desired, at atmospheric or super-atmospheric pressures.

Following the dyeing or printing of the polymer composition, the colored material may be contracted with a hot aqueous soap solution or a solution of a suitable detergent, rinsed with water, and dried.

The following examples illustrate the invention. In these examples all parts are by weight unless otherwise indicated.

EXAMPLE 1

Product of the Reaction of Full Nickel Phenolate of o,o'-Bis(p-1,1,3,3-tetramethylbutylphenol)Sulfone and Diisodecyl Pentaerythrityl Diphosphite A green-colored solution is prepared by dissolving 100 parts by weight of the full nickel phenolate of o,o'-bis(p-1,1,3,3-tetramethylbutylphenol)sulfone and 30 parts by weight of diisodecyl pentaerythrityl diphosphite in 600 parts by weight of toluene at room temperature. The solution is refluxed for two hours and then concentrated under vacuum to remove the toluene and obtain a green-colored solid which is subsequently dried in a vacuum oven at 50° C.

EXAMPLES 2-5

The procedure of Example 1 was repeated to prepare adducts with various phosphites as indicated below:

| Example | Phosphite |
| --- | --- |
| 2 | Tridecylphosphite |
| 3 | Diisooctylphosphite |
| 4 | Tris nonylphenylphosphite |

| Example | Phosphite |
|---|---|
| 5 | Distearylphosphite |

EXAMPLES 6–10

Unstabilized polypropylene (100 parts) is dry blended with 0.2 part of Cyanox ® 1735, (a processing antioxidant of American Cyanamid Company which is a mixture consisting of 50% by weight of tridecyl phosphite, 40% by weight of 2,4-dinonylphenol, and 10% by weight of 2,2'-methylenebis(4,6-dinonylphenol)), 0.1 part of calcium stearate, 1.3 parts of the reaction products of the full nickel phenolate of o,o'-bis(p-1,1,3,3-tetramethylbutylphenol)sulfonate, and the organic phosphites as prepared in Examples 1–5. The blended mixture is inserted into a Melt Index Apparatus preheated to 220° C. After 5 minutes aging at 220° C., the mixture is extruded and the extrudate is compression molded into films. Example 9 is extruded at 290° C.

For comparison purposes, the above procedure is repeated except that the dry blend contains a mixture of the full nickel phenolate and the corresponding organic phosphite instead of the pre-reacted adduct.

The films are cleansed by immersion in an aqueous solution (60° C.) containing 0.5% by weight of isooctyl phenoxy polyethoxy ethanol and rinsed with water. The cleansed film is then immersed for 10 minutes in an aqueous dye bath (95°–100° C.) containing 0.13% by weight of Polypropylene Scarlet RBM, 2% by weight of citric acid, and 0.1% by weight of a polyether alcohol (Deceresol ® Surfactant NI Conc; American Cyanamid Company).

The dyeability of the material is quantitatively assessed by determining the optical density, O.D., using a Macbeth Densitometer. The higher the optical density, the better the dyeability of the film. A difference in optical density of 0.02 units is readily discernable and is significant.

The optical density results of the simple mixtures are compared to the prereacted adducts in Table I below where it is readily apparent that the prereacted adducts give a 20–25% improvement in the dyeability as compared to the mixtures.

TABLE I

| Example | Phosphite | Adduct or Mixture | Optical Density |
|---|---|---|---|
| 6 | Diisodecyl pentaerythritol diphosphite | Adduct | 0.47 |
| Comparison | Diisodecyl pentaerythritol diphosphite | Mixture | 0.38 |
| 7 | Tridecylphosphite | Adduct | 0.34 |
| Comparison | Tridecylphosphite | Mixture | 0.27 |
| 8 | Diisoctylphosphite | Adduct | 0.45 |
| Comparison | Diisoctylphosphite | Mixture | 0.38 |
| 9* | Tris nonylphenyl phosphite | Adduct | 0.14 |
| Comparison* | Tris nonyle phenyl phosphite | Mixture | 0.09 |
| 10 | Distearylphosphite | Adduct | 0.44 |
| Comparison | Distearyl- phosphite | Mixture | 0.39 |
| Comparison | None | — | 0.06 |

*Extruded at 290° C.

What is claimed is:

1. A dyeable olefinic polymer composition comprising an olefinic polymer, about 0.7 to 4% by weight of the reaction product of about 50 to 90% by weight of the full nickel phenolate of o,o'-bis(p-1,1,3,3-tetramethylbutylphenol)sulfone, and about 50 to 10% by weight of a secondary or tertiary organic phosphite.

2. The composition of claim 1 wherein in the reaction product the nickel phenolate is present in about 85 to 65% by weight, and the phosphite is present in about 15 to 35% by weight.

3. The composition of claim 1 wherein the olefinic polymer is poly alpha-olefin.

4. The composition of claim 1 wherein the olefinic polymer is polypropylene.

5. The composition of claim 1 wherein the phosphite is diisodecyl pentaerythrityl diphosphite.

6. The composition of claim 1 wherein the phosphite is triisodecyl phosphite.

7. The composition of claim 1 which is dyed with an ortho hydroxy monoazo dye.

8. A method of dyeing an olefinic polymer composition comprising:
  (a) incorporating into an olefinic polymer about 0.7 to 4% by weight of the reaction product of about 50 to 90% by weight of the full nickel phenolate of o,o'-bis(p-1,1,3,3-tetramethylbutylphenol)sulfone and about 50 to 10% by weight of a secondary or tertiary organic phosphite,
  (b) forming a fiber or film therefrom, and
  (c) contacting said fiber on film with a chelatable dye.

9. The method of claim 8 wherein the reaction product is prepared from 85 to 65% by weight of the nickel phenolate and 15 to 30% by weight of the phosphite.

10. The method of claim 8 wherein the olefinic polymer is a poly alpha-olefin.

11. The method of claim 8 wherein the olefinic polymer is polypropylene.

12. The method of claim 8 wherein the phosphite is diisodecyl pentaerythrityl diphosphite.

13. The method of claim 8 wherein the phosphite is triisodecyl phosphite.

14. The method of claim 8 wherein the chelatable dye is an ortho hydroxy monoazo dye.

* * * * *